United States Patent
Matama

(10) Patent No.: US 6,259,537 B1
(45) Date of Patent: Jul. 10, 2001

(54) IMAGE PROCESSING METHOD AND IMAGE PROCESSING APPARATUS

(75) Inventor: Tooru Matama, Kanagawa (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/056,861

(22) Filed: Apr. 8, 1998

(30) Foreign Application Priority Data

Apr. 10, 1997 (JP) ................................. 9-092522

(51) Int. Cl.$^7$ ........................................ G06K 9/40
(52) U.S. Cl. ............................... 358/1.9; 382/261
(58) Field of Search ..................... 382/199, 261–269, 382/260, 298–300; 358/1.9

(56) References Cited

U.S. PATENT DOCUMENTS

| 5,051,902 | * | 9/1991 | Hishinuma | 364/413.13 |
| 5,485,534 | * | 1/1996 | Takemoto et al. | 382/263 |
| 5,739,922 | * | 4/1998 | Matama | 358/447 |
| 5,978,518 | * | 11/1999 | Oliyide et al. | 382/260 |
| 6,055,340 | * | 4/2000 | Nagao | 382/261 |
| 6,091,861 | * | 9/1991 | Keyes et al. | 382/299 |

* cited by examiner

Primary Examiner—Thomas D. Lee
Assistant Examiner—Stephen Brinich
(74) Attorney, Agent, or Firm—Sughrue, Mion, Zinn, Macpeak & Seas, PLLC

(57) ABSTRACT

An image processing method, comprising the steps of: picking up an image recorded onto a photographic film which has been developed by dry development and generating a digital image data; determining image quality reduction degree due to graininess on the basis of any of the sensitivity of the photographic film and the film size of the photographic film, and determining a graininess parameter for reducing graininess and a sharpness parameter for determining sharpness emphasizing degree on the basis of the result of determination; and effecting image processing of the digital image data by using at least one of the determined graininess parameter and sharpness parameter.

21 Claims, 6 Drawing Sheets

F I G. 5
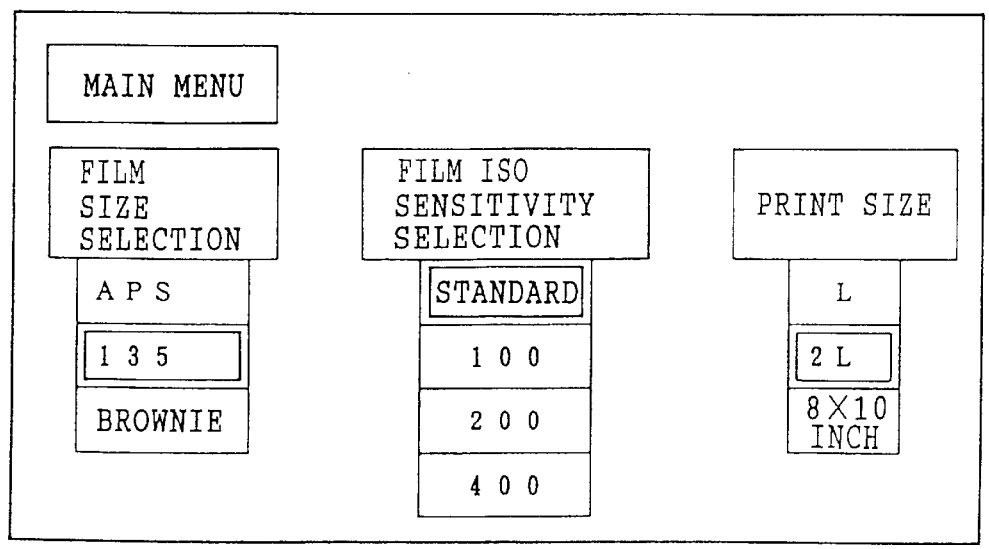

FIG. 6

| STANDARD ISO SENSITIVITY STORAGE MENU |

APS
- 100
- 200
- 400

135
- 25
- 50
- 100
- 200
- 400
- 800
- 1600

BROWNIE
- 50
- 100
- 160

IMAGE PROCESSING METHOD AND IMAGE PROCESSING APPARATUS

BACKGROUND OF THE INVENTION

1. Field of the Invention

The present invention relates to an image processing method which optically reads an image recorded onto a photographic film which has been developed by dry development and determines an image processing parameter for generating a digital image data.

2. Description of the Related Art

Conventionally, graininess in a photographic print is primarily caused by exposure at the time of photographing and is influenced by underexposure or overexposure of the photographic print. The greater the underexposure at the time of photographing, the more conspicuous the graininess.

The graininess is secondarily caused by enlargement ratio at the time of printing. The larger the enlargement ratio at the time of printing, the more conspicuous the graininess.

Further, the graininess is thirdly caused by ISO sensitivity. In a current photographic film, the higher the ISO sensitivity, the more grainy and more conspicuous the graininess.

It is preferable that the above-described image processing parameter be determined in accordance with the respective contribution ratios of the causes.

Sharpness emphasizing degree, reproduction of contrast in an image of an underexposed photographic film, or the like as an image processing parameter has a trade-off relationship to granularity. Accordingly, it is particularly important to set an optimal image processing parameter. Among the above causes, the first cause, i.e., exposure at the time of photographing, can be determined by the density of the photographic film. The second cause, i.e., enlargement ratio of a print, is carried out by the designation of an operator and can be naturally recognized by a photographic processing apparatus.

On the contrary, in the third cause, i.e., ISO sensitivity, a new sensor which reads a DX code recorded on a photographic film must be provided. Accordingly, the number of parts for the apparatus is increased and the device becomes large and complicated.

Silver image remains in particular in a photographic film which is processed by dry development, and the graininess of the silver image is added thereto. Consequently, unless the optimal image processing parameter is set, the degree of influence due to the graininess of the silver image increases. Further, in order to reproduce color saturation, the graininess of the photographic film subjected to dry development deteriorates more than that of a photographic film subjected to wet development.

SUMMARY OF THE INVENTION

With the aforementioned in view, an object of the present invention is to provide a method of and an apparatus for processing an image in which ISO sensitivity or information which has correlation with the ISO sensitivity is recognized without using an extra detecting device, and in which an optimal image processing parameter in a photographic film which is subjected to dry development can be obtained.

In order to achieve the above-described object, a first aspect of the present invention is an image processing method, comprising the steps of: picking up an image recorded onto a developed photographic film and generating a digital image data; determining at least one of a graininess parameter for reducing graininess and a sharpness parameter for determining sharpness emphasizing degree on the basis of any of the sensitivity of the photographic film and the film size of the photographic film; and effecting image processing of the digital image data by using at least one of the determined graininess parameter and sharpness parameter.

In accordance with the first aspect, at least one of the graininess parameter for reducing graininess and the sharpness parameter for determining sharpness emphasizing degree is determined on the basis of any of the sensitivity of the photographic film and the film size of the photographic film.

A gain M, which is multiplied by an intermediate frequency component of a luminance component, can be used as the graininess parameter. A gain H, which is multiplied by a high frequency component of the luminance component, can be used as the sharpness parameter.

Because an image processing parameter which includes the graininess parameter and the sharpness parameter relates to the sensitivity of the photographic film, the graininess parameter and the sharpness parameter can be determined on the basis of the sensitivity of the photographic film.

Further, in a current photographic film, there is a correlation between the size thereof and standard ISO sensitivity.

More specifically, the standard sensitivity of a Browniesize film is ISO 160, the standard sensitivity of a 135-size film is ISO 400, and the standard sensitivity of an APS (advanced photo system)-size film is ISO 200, and the like.

Since, for example, negative carriers themselves are manufactured in different ways or, even if the negative carriers are manufactured in the same way, the guide width of the film is set so as to correspond to the film size, the size of the photographic film is known beforehand. Even if a special detecting device is not used in a printer, the information on the size of the photographic film is easily available.

Thus, in the first aspect of the present invention, in a case in which the image processing parameter based on the ISO sensitivity is set, the information on the size of the photographic film is extracted, the ISO sensitivity is specified from the information on the size of the photographic film, and the image processing parameter is determined.

As a result, the optimal image processing parameter for graininess and the optimal image processing parameter for sharpness emphasizing degree, which has a trade-off relationship with the graininess, can be set respectively.

Because the graininess of the image recorded onto the photographic film which has been developed by dry development is deteriorated due to the remaining of a silver image, the present invention is suitable for image processing of the image recorded onto the photographic film which has been developed by dry development.

In the first aspect, the relationship between any of the sensitivity of the photographic film and the film size of the photographic film and at least one of the graininess parameter and the sharpness parameter is determined in advance. Accordingly, at least one of the graininess parameter and the sharpness parameter which corresponds to any of the sensitivity of the photographic film and the film size of the photographic film can be determined.

Further, image quality reduction degree due to graininess is determined on the basis of the sensitivity of the photographic film and the film size of the photographic film, and the graininess parameter and the sharpness parameter can be determined on the basis of the result of determination.

Moreover, the exposed state of the image recorded onto the photographic film and the print size which is printed based on the digital image data relate to the graininess and the sharpness emphasizing degree. Thus, the image quality reduction degree due to graininess is determined in further consideration of the exposed state of the image and the print size, and the graininess parameter and the sharpness parameter may be determined on the basis of the result of determination. In this case, if the sensitivity of the photographic film is high, if the image recorded onto the photographic film is underexposed, and if the print size is large, the graininess of the reproduced image becomes high. Consequently, it is preferable that the graininess parameter be set small. Further, if the film size is small, the sharpness of the reproduced image deteriorates. Accordingly, it is preferable that the sharpness parameter be determined so that the sharpness emphasizing degree becomes strong.

The graininess or the sharpness emphasizing degree may be determined in accordance with the user's or customer's preference. In this case, the image quality reduction degree due to graininess is determined on the basis of information to which a data representing the sharpness emphasizing degree is further added, and the graininess parameter and the sharpness parameter may be determined on the basis of the result of determination.

Because the graininess has a trade-off relationship to the sharpness, the sharpness emphasizing degree weakens if the graininess is suppressed, and the graininess deteriorates if the sharpness emphasizing degree is strengthened.

In the image processing, the low frequency component of the digital image data and the intermediate/high frequency component of the digital image data are determined. Then, a product of the intermediate frequency component and the graininess parameter, a product of the high frequency component and the sharpness parameter, and the low frequency component of the digital image data are summed.

A second aspect of the present invention is an image processing method, comprising the steps of: picking up an image recorded onto a developed photographic film and generating a digital image data; selecting the standard sensitivity of the photographic film corresponding to the film size of the developed photographic film on the basis of a corresponding relationship between a plurality of film sizes of a photographic film and the standard sensitivity of a photographic film which correlates to each of the film sizes; determining at least one of a graininess parameter for reducing graininess and a sharpness parameter for determining sharpness emphasizing degree on the basis of the selected standard sensitivity of the photographic film; and effecting image processing of the digital image data by using at least one of the corrected graininess parameter and sharpness parameter.

In the second aspect, the standard sensitivity of the photographic film is selected on the basis of the corresponding relationship between a plurality of film sizes of a photographic film and the standard sensitivity of a photographic film which correlates to each of the film sizes. Accordingly, if means for storing standard ISO sensitivity is provided for every film size and the sensitivity is stored in the storing means, the global change in the standard ISO sensitivity of a film can be coped by only changing the storage within the storing means. Thus, it is further desirable.

A third aspect of the present invention is an image processing apparatus, comprising: generating means which picks up an image recorded onto a developed photographic film and generates a digital image data; storing means which stores corresponding relationship between a plurality of film sizes of a photographic film and the standard sensitivity of a photographic film which correlates to each of the film sizes; selecting means which selects the standard sensitivity of the photographic film corresponding to the film size of the developed photographic film on the basis of the corresponding relationship stored in the storing means; determining means which determines at least one of a graininess parameter for reducing graininess and a sharpness parameter for determining sharpness emphasizing degree on the basis of the selected standard sensitivity of the photographic film; and processing means which effects image processing of the digital image data by using at least one of the determined graininess parameter and sharpness parameter.

In the third aspect, discriminating means which discriminates the film size of the developed photographic film is provided, and the determining means determines image quality reduction degree due to graininess on the basis of the selected standard sensitivity of the photographic film. At least one of the graininess parameter and the sharpness parameter can be determined on the basis of the result of determination.

In this discrimination, the film size may be discriminated from the content in which an operator inputs by key operation or from the specification of a printer (the type and the print opening of a film carrier and the state in which the guide width of a film is set) which is used after the image processing parameter was determined.

In any case, because the film size can be recognized even if a new detecting device or the like is not added to the present apparatus, the apparatus will not be large and complicated.

The film size correlates to the ISO sensitivity, such that the standard ISO sensitivity of the photographic film can be determined from the film size. The determining means determines the degree, to which the image quality deteriorates due to graininess, on the basis of the ISO sensitivity in addition to the information on the exposed state at the time of photographing and the print enlargement ratio.

In the determining means, the sharpness emphasizing degree, to which graininess and sharpness are compatible, is set on the basis of the result of determining graininess.

In this way, it is possible to obtain the image processing parameter in which graininess and sharpness emphasizing degree, which have a trade-off relationship, are optimal.

In the third aspect, since the ISO sensitivity for every size is stored in the storing means, even if there is a change in the correlation between the film size and the ISO sensitivity in the future, the change can be coped by only rewriting the storage within the storing means.

As described above, the present invention has a superior effect in that ISO sensitivity or information on the film size which has correlation with the ISO sensitivity is recognized without using an extra detecting device, and in that an optimal image processing parameter in a photographic film which is subjected to dry development or the like can be obtained.

BRIEF DESCRIPTION OF THE DRAWINGS

FIG. 5 is an elevational view which shows the display contents of a main menu.

FIG. 6 is a corresponding view of standard ISO sensitivities for every film size.

DESCRIPTION OF THE PREFERRED EMBODIMENTS

Figure 1:
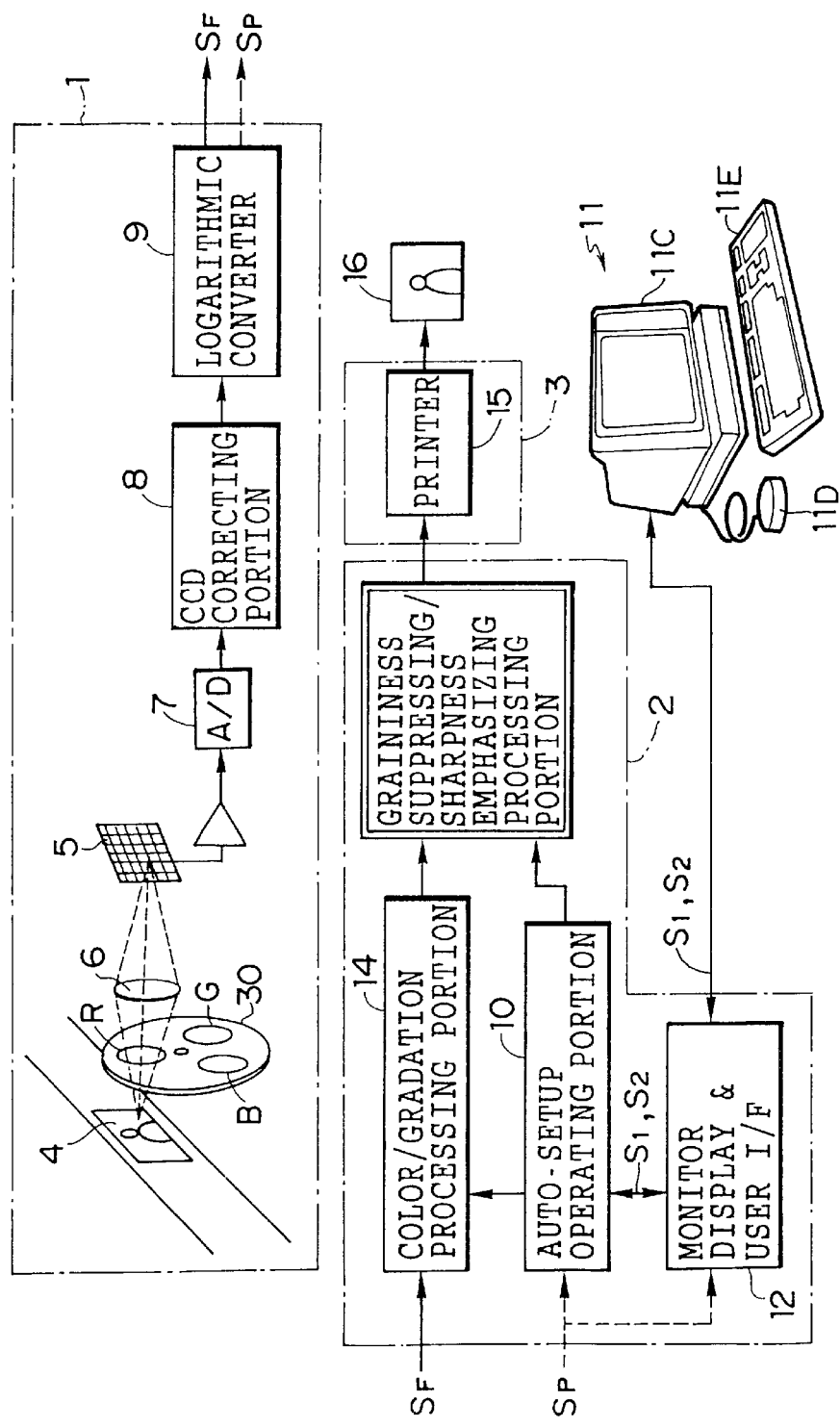
FIG. 1 is a block diagram of a system to which an image processing apparatus relating to a present embodiment is applied.

FIG. 1 is a block diagram of a system in which an image of a color photography is read and formed on a recording material (a photosensitive material is used in the present embodiment) 16.

As shown in FIG. 1, the present system is formed by a picking-up device 1 which picks up an image of a color photography, an image processing device 2 which effects image processing on an image signal which represents the image of the color photography picked up by the picking-up device 1, and regenerating means 3 which records the image signal, which has been subjected to image processing by the image processing device 2, onto the photosensitive material 16 as a visible image.

The picking-up device 1 includes a two-dimensional CCD array 5 for optically picking up color image signals R, G, B from a color image 4 recorded onto a negative film, reversal film, or the like and an image forming lens 6 for forming an image of the light from the color image 4 on the CCD array 5.

In the present embodiment, the CCD array 5 is formed of 2760 pixels by 1840 pixels. A filter turret 30, to which three color-separation filters of red (R), green (G), and blue (B) are attached, is rotated, and the respective color-separation filters are successively disposed on an optical path so as to scan the image. The full color image is thereby obtained planar-successively.

Further, the picking-up device 1 has an A/D converter 7 which digitally converts an image signal representing a color image detected by the CCD array 5, a CCD correcting portion 8 which corrects the signal output from the CCD array 5, and a logarithmic converter 9 which includes a lookup table (LUT) which logarithmically converts the image signal representing the color image corrected by the CCD correcting portion 8.

In the picking-up device 1, before the three image signals of R, G, B are obtained, pre-scan, i.e., the color image 4 is optically picked up at rough scanning intervals and the scheme of the color image 4 is picked up, is carried out so as to obtain a pre-scan data $S_P$. Thereafter, fine scan, i.e., the color image 4 is picked up at fine scanning intervals, is carried out so as to obtain a fine scan data $S_F$.

The image processing device 2 is formed by: an auto-setup operating portion 10 which sets a parameter for gradation processing or the like upon fine scan on the basis of the pre-scan data $S_P$; a color/gradation processing portion 14 which effects the color/gradation processing of the fine scan data $S_F$ on the basis of the parameter determined by the auto-setup operating portion 10; a monitor display and user interface (hereinafter, "I/F") 12 for connecting the auto-setup operating portion 10 and an external control unit (personal computer) 11, which regenerates a visible image on the basis of the pre-scan data $S_P$; and a graininess suppressing/sharpness emphasizing processing portion (hereinafter only referred to as "processing portion") 13 which effects graininess suppressing processing and sharpness emphasizing processing on the color image signal.

Further, the regenerating means 3 has a printer 15 which records an image on the photosensitive material 16 on the basis of the color image signal.

The operation of respective parts will be explained hereinafter.

Firstly, the picking-up device 1 carries out pre-scan, i.e., the scheme of the color image 4 recorded onto a negative film, a reversal film, or the like is picked up at rough scanning intervals.

Figure 4:
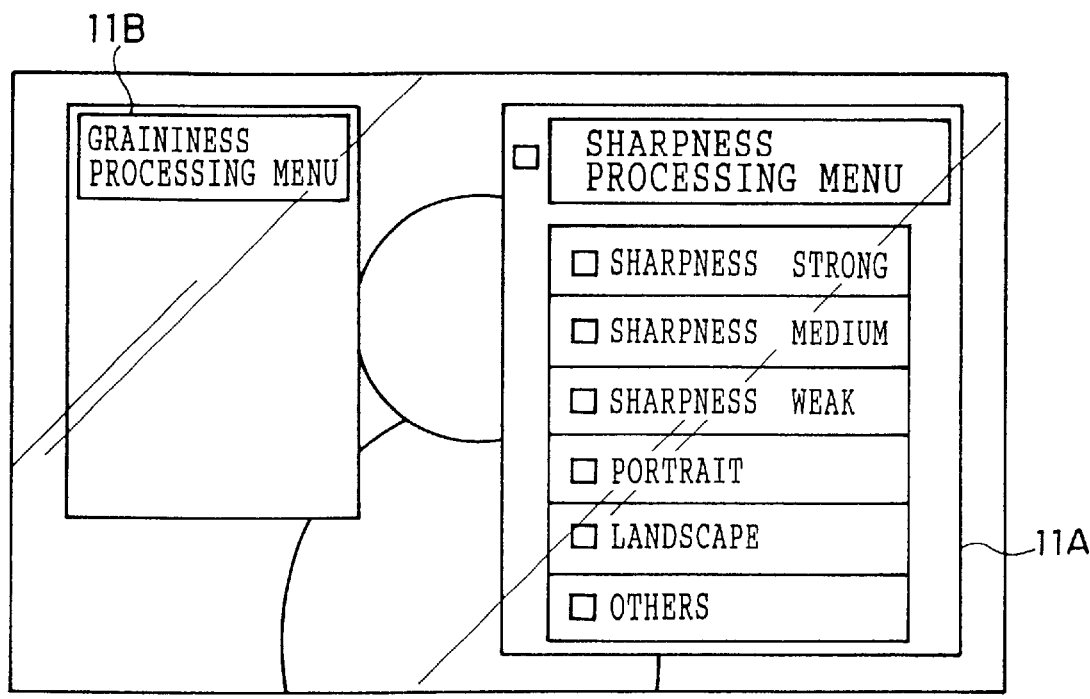
FIG. 4 is an elevational view which shows a window screen displayed on a monitor in an external control device.

The pre-scan data Sp having three colors which has been obtained by the pre-scan is converted into a digital data by the A/D converter 7, corrected by the CCD correcting portion 8, logarithmically converted by the logarithmic converter 9, and input to the auto-setup operating portion 10 and the I/F 12 in the image processing device 2. The pre-scan data Sp input to the I/F 12 is displayed on a monitor 11C of the external control unit 11 as a visible image. A sharpness processing menu 11A (see FIG. 4) is displayed on the monitor 11C of the external control unit 11 in addition to the visible image, and an operator selects a desirable menu from the sharpness processing menu 11A. A signal $S_1$, which represents the result of selection, is input to the auto-setup operating portion 10 via the I/F 12.

Moreover, a graininess processing menu 11B is displayed on the monitor 11C of the external control unit 11 due to the switching (or overlapping display) by the operator. As the operator selects the types of a photographic film from the graininess processing menu 11B, a signal $S_2$, which represents the result of selection, is input to the auto-setup operating portion 10 via the I/F 12.

FIG. 5 shows a main menu of graininess processing. Three menus, i.e., film size selection, film ISO sensitivity selection, and a print size are set in this menu.

Among them, the film size is selected manually from the menu or determined and selected automatically by film size determining means. In the film ISO sensitivity selection, if a standard menu is selected, a standard ISO sensitivity is set in accordance with the film size. The film ISO sensitivity may be set manually to ISO 100, ISO 200, ISO 400, or the like.

The print size is selected from the menu of the print size requested by a customer. FIG. 6 shows a standard ISO sensitivity table for every film size. As shown in FIGS. 5 and 6, the menu surrounded by a frame is currently set. FIG. 6 shows a state in which "standard" is selected from of the film ISO sensitivity of the main menu in FIG. 5 and the ISO sensitivities for respective film sizes are set.

In the auto-setup operating portion 10, a parameter for a color/gradation processing which is effected by the color/gradation processing portion 14 and a parameter for a gain and the like are operated on the basis of the pre-scan data and the signals $S_1$, $S_2$.

An operation of a parameter including a gain will be described in detail. In the auto-setup operating portion 10, the density range, i.e., image range, of the color image 4 is determined on the basis of the input pre-scan data $S_P$. Moreover, a gain M and a gain H are determined on the basis of the signals $S_1$, $S_2$ input from the external control unit 11 via the I/F 12 and then input to the processing portion 13. The gain M is multiplied by an intermediate frequency component and the gain H is multiplied by a high frequency component in the sharpness emphasizing processing and graininess suppressing processing which are effected in the processing portion 13, to be described later. Further, the parameter for processing color/gradation which is effected in the color/gradation processing portion 14 is determined and input to the color/gradation processing portion 14.

Next, in the picking-up device 1, the fine scan, i.e., the color image 4 is picked up at fine scanning intervals, is carried out and the fine scan data SF having three colors is obtained as the color image signal. The fine scan data $S_F$ is converted into digital data by the A/D converter 7, corrected by the CCD correcting portion 8, logarithmically converted by the logarithmic converter 9, and input to the color/gradation processing portion 14.

In the color/gradation processing portion 14, the fine scan data $S_F$ is subjected to color/gradation processing and the processed data is input to the processing portion 13. A processing which is effected in the processing portion 13 will be explained hereinafter.

Figure 2:
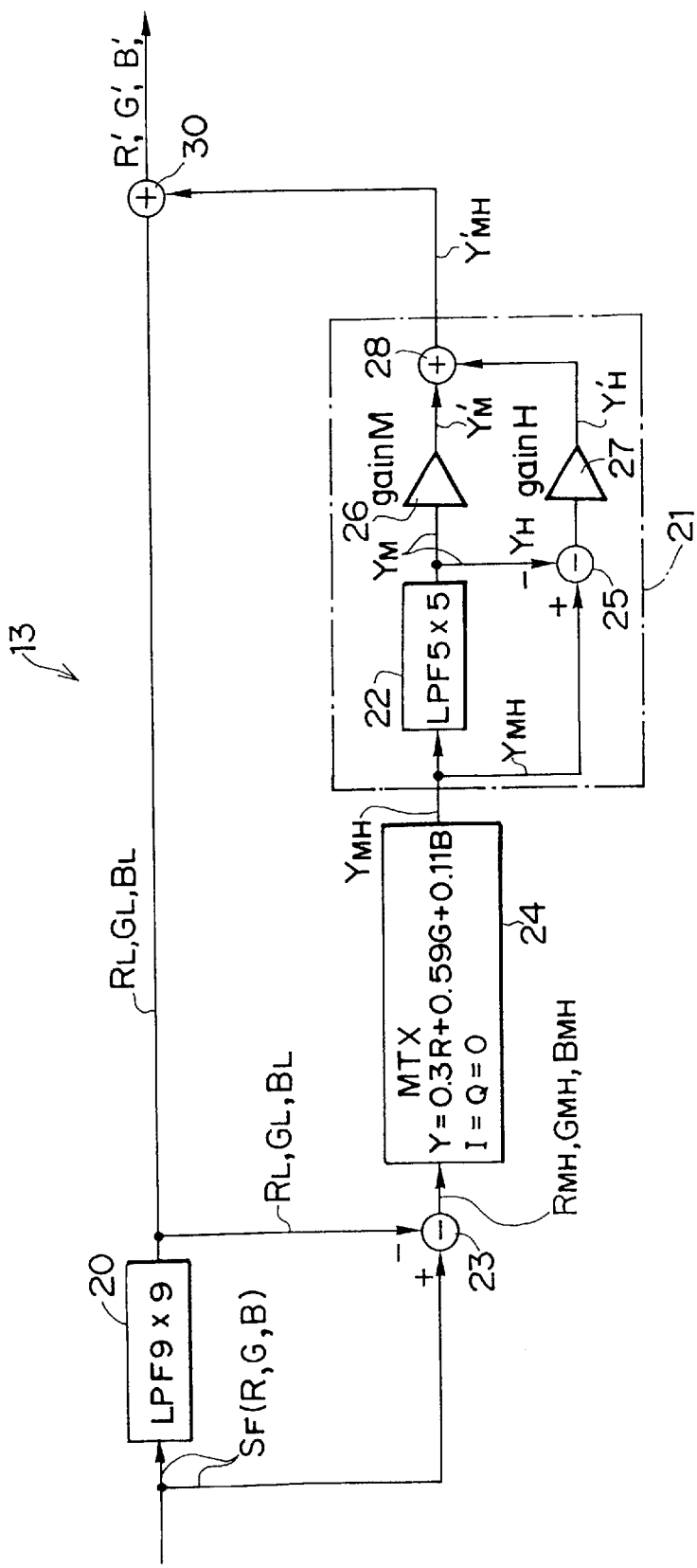
FIG. 2 is a block diagram which shows an example of graininess suppressing and sharpness emphasizing processings relating to the present embodiment.

FIG. 2 is a block diagram for explaining the detail of a processing effected in the processing portion 13. As shown in FIG. 2, a filtering processing is effected on the fine scan data $S_F$ (R, G, B) by a 9 by 9 low pass filter in which a 5 by 5 low pass filter, which will be shown in the following formula (1), is cascade-connected by two stages, such that low frequency components $R_L$, $G_L$, $B_L$ of the fine scan data $S_F$ (R, G, B) are extracted.

$$\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix} \quad (1)$$

Then, the low frequency components $R_L$, $G_L$, $B_L$ are subtracted from the fine scan data $S_F$ by a subtracter 23 so as to extract the intermediate/high frequency components $R_{MH}$, $G_{MH}$, $B_{MH}$. After the above-described extraction, the low frequency components $R_L$, $G_L$, $B_L$ do not include edges in a color image, fine texture, or the graininess of a film.

On the other hand, the intermediate frequency components $R_M$, $G_M$, $B_M$ include the graininess of a film, and the high frequency components $R_H$, $G_H$, $B_H$ include the edges in a color image and the fine texture.

Figure 3:
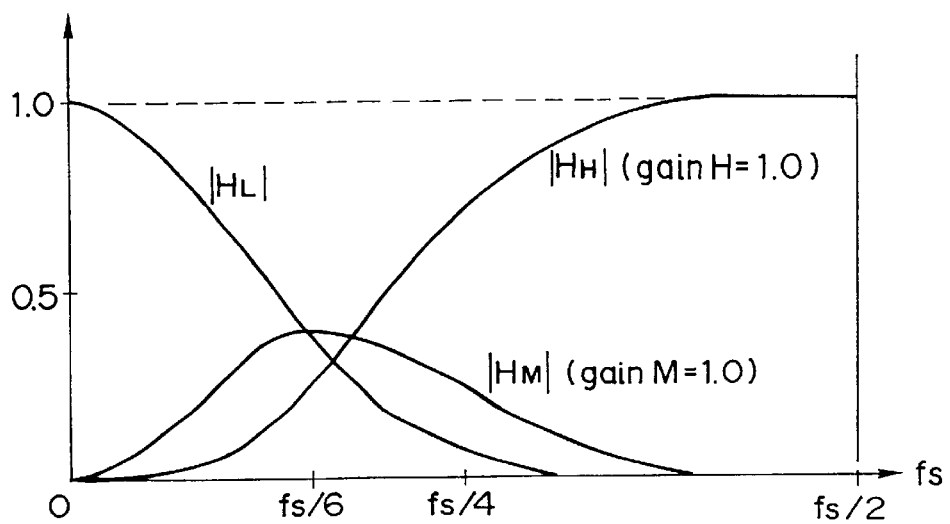
FIG. 3 is a characteristic view which shows the distributions of low, intermediate, and high frequency components.

The low frequency component, the intermediate frequency component, and the high frequency component are the frequency components which are distributed as shown in FIG. 3 in a case in which the gains M and H multiplied by the intermediate/high frequency components, which will be described later, are 1.0. At this time, as shown in FIG. 3, the intermediate frequency components $R_M$, $G_M$, $B_M$ form a distribution $H_M$ which has a peak in the vicinity of one third of Nyquist frequency fs/2 of the outputs when the processed data is reproduced as a visible image. Moreover, the low frequency components $R_L$, $G_L$, $B_L$ form a distribution $H_L$ which has a peak at the frequency 0. The high frequency components $R_H$, $G_H$, $B_H$ form a distribution $H_H$, which has a peak at the Nyquist frequency fs/2 of the outputs.

The Nyquist frequency in the present embodiment is the Nyquist frequency in which recording onto the photosensitive material 16 is effected at 300 dpi. In FIG. 3, the sum of the frequency components at each of the frequencies is 1.

Next, in a luminance component extracting circuit 24, a luminance component is extracted from the extracted intermediate/high frequency components $R_{MH}$, $G_{MH}$, $B_{MH}$. The luminance component extracting circuit 24 extracts a component $Y_{MH}$ as the luminance component of data when the intermediate/high frequency components $R_{MH}$, $G_{MH}$, $B_{MH}$ of the fine scan data $S_F$ are converted into the intermediate/high frequency components of YIQ base. The conversion into the YIQ base is carried out by the following formula (2).

$$\begin{pmatrix} I \\ Q \\ Y \end{pmatrix} = \begin{pmatrix} 0.06 & -0.28 & -0.32 \\ 0.21 & -0.52 & 0.31 \\ 0.30 & 0.59 & 0.11 \end{pmatrix} \begin{pmatrix} R \\ G \\ B \end{pmatrix} \quad (2)$$

Because components $I_{MH}$ and $Q_{MH}$, which are the color components converted into the YIQ base, include graininess of a color caused by the graininess of a film, the components $I_{MH}$ and $Q_{MH}$ are set to 0 so as to suppress the graininess of the color caused by the graininess of the film.

Experience has shown that, in case of an image which has photographed an ordinary object, the color components $I_{MH}$ and $Q_{MH}$ have little components. Accordingly, as the components $I_{MH}$ and $Q_{MH}$ are considered as the graininess of the color caused by the graininess of the film and set to 0, a good regenerated image in which graininess is suppressed can be obtained.

Next, a filtering processing is effected on the component $Y_{MH}$ by a 5 by 5 low pass filter 22 in a gain processing portion 21 so as to obtain an intermediate frequency component $Y_M$ of the component $Y_{MH}$. Further, the intermediate frequency component $Y_M$ is subtracted from the component $Y_{MH}$ by a subtracter 25 so as to obtain the high frequency component $Y_H$ of the component $Y_{MH}$.

Next, as shown in the following formula (1), the gain M and the gain H, which were obtained in the aforementioned auto-setup operating portion 10, are respectively multiplied by the component $Y_M$ in an amplifier 26 and the component $Y_H$ in an amplifier 27 so as to obtain processed components $Y_M'$ and $Y_H'$. Then, the processed components $Y_M'$, $Y_H'$ are added in an adder 28 so as to obtain the component $Y_{MH}'$.

$$Y_{MH}' = \text{gain M} \times Y_M + \text{gain H} \times Y_H \quad (1)$$

$$(Y_M' = \text{gain M} \times Y_M, Y_H' = \text{gain H} \times YH)$$

In the auto-setup operating portion 10, the gain M is set smaller than the gain H. Namely, since the intermediate frequency component includes a relatively large amount of graininess of the luminance component based on the graininess of a film, the sense of graininess can be suppressed by setting the gain M of the component $Y_M$ relatively small. Further, because the degree of sharpness of an image depends on the high frequency component of the luminance component, the sharpness of the processed image can be emphasized by setting the gain H of the high frequency component $Y_H$ of the luminance component relatively large.

In the auto-setup operating portion 10, image quality reduction degree due to graininess is determined on the basis of the sensitivity (e.g., standard ISO sensitivity) of a photographic film, the exposed state of an image recorded onto a photographic film, and the print size which is printed based on the digital image data, and the gain M serving as a graininess parameter and the gain H serving as a sharpness parameter are determined on the basis of the result of determination. For example, in a case in which the color image 4 is an underexposed negative, the graininess caused by the graininess of a film is conspicuous, and in addition, the color image 4 becomes a poor image having considerably large granularity if the contrast is enhanced to improve the gradation characteristics. Accordingly, the gain M is set considerably low.

As a result, the granularity can be suppressed low. Moreover, the optimal gains M and H which depend on the print size are set. Further, as mentioned above, in a case in which an operator selects desirable menus in accordance with a customer's preference from the sharpness emphasizing processing menu and the graininess suppressing processing menu, it is preferable that the gains M and H in accordance with the menus be stored as a table and the optimal gains M and H be selected in accordance with the selection of the menus. As a result, each image can be processed in accordance with the customer's preference.

The component $Y_{MH}'$, which was obtained in this way, is added to the low frequency components $R_L$, $G_L$, $B_L$ of the aforementioned fine scan data $S_F$ so as to obtain processed signals R', G', B'.

At this time, since the values of the aforementioned components $I_{MH}$ and $Q_{MH}$ are set to 0, when the processed luminance component $Y_{MH}'$ is inversely converted so as to correspond to the data R, G, B, the values of three data R, G, B are the same as that of the component $Y_{MH}'$.

Therefore, even if the processed luminance component $Y_{MH}'$ is not inversely converted, the added result is the same as the one which is inversely converted and added. Thus, in the present embodiment, in order to facilitate the processing, the processed luminance component $Y_{MH}'$ is added without being inversely converted.

Thereafter, the processed signals R', G', B' are input to the regenerating device 3 and regenerated on the photosensitive material 16 as a visible image by the printer 15.

In the image regenerated as such, the color components of the intermediate/high frequency components of data relating to the graininess of a film are set to 0, and further, the gain M of the intermediate frequency component $Y_M$ of the luminance component of the intermediate/high frequency component is suppressed and the gain H of the high frequency component $Y_H$ is emphasized. Consequently, it is possible to achieve the image in which the sharpness is emphasized and the graininess caused by the graininess of a film is suppressed.

What is claimed is:

1. An image processing method, comprising the steps of:
   picking up an image recorded onto a developed photographic film and generating a digital image data;
   determining at least one of a graininess parameter for reducing graininess and a sharpness parameter for determining sharpness emphasizing degree on the basis of any of the sensitivity of the photographic film and the film size of the photographic film; and
   effecting image processing of the digital image data by using at least one of the determined graininess parameter and sharpness parameter.

2. An image processing method according to claim 1, wherein the image is an image recorded onto a photographic film which has been developed by dry development.

3. An image processing method according to claim 1, wherein in said determining step, image quality reduction degree due to graininess is determined on the basis of any of the sensitivity of the photographic film and the film size of the photographic film, and at least one of the graininess parameter and the sharpness parameter is determined on the basis of the result of determination of image quality reduction degree.

4. An image processing method according to claim 1, wherein in said determining step, the image quality reduction degree due to graininess is determined on the basis of information on the exposed state of the image recorded onto the photographic film and the print size which is printed based on the digital image data in addition to any of the sensitivity of the photographic film and the film size of the photographic film, and at least one of the graininess parameter and the sharpness parameter is determined on the basis of the result of determination of image quality reduction degree.

5. An image processing method according to claim 4, wherein in a case in which the sensitivity of the photographic film is high, in a case in which the image recorded onto the photographic film is underexposed, and in a case in which the print size is large, the graininess parameter is set small, and in a case in which the film size is small, the sharpness parameter is determined so that the sharpness emphasizing degree is strong.

6. An image processing method according to claim 1, wherein in said determining step, at least one of the graininess parameter and the sharpness parameter is determined on the basis of the image quality reduction degree due to graininess, which is determined based on any of the sensitivity of the photographic film and the film size of the photographic film, and an input data representing the sharpness emphasizing degree.

7. An image processing method according to claim 1, wherein in said image processing step,
   a low frequency component of the digital image data and an intermediate/high frequency component of the digital image data are determined, and
   a sum of a product of the intermediate frequency component and the graininess parameter, a product of the high frequency component and the sharpness parameter, and the low frequency component of the digital image data is output as an image processed signal.

8. An image processing method, comprising the steps of:
   picking up an image recorded onto a developed photographic film and generating a digital image data;
   selecting the standard sensitivity of the photographic film corresponding to the film size of the developed photographic film on the basis of a corresponding relationship between a plurality of film sizes of a photographic film and the standard sensitivity of a photographic film which correlates to each of the film sizes;
   determining at least one of a graininess parameter for reducing graininess and a sharpness parameter for determining sharpness emphasizing degree on the basis of the selected standard sensitivity of the photographic film; and
   effecting image processing of the digital image data by using at least one of the corrected graininess parameter and sharpness parameter.

9. An image processing method according to claim 8, wherein the image is an image recorded onto a photographic film which has been developed by dry development.

10. An image processing method according to claim 8, wherein in said determining step, image quality reduction degree due to graininess is determined on the basis of the selected standard sensitivity of the photographic film, and at least one of the graininess parameter and the sharpness parameter is determined on the basis of the result of determination of image quality reduction degree.

11. An image processing method according to claim 8, wherein in said determining step, the image quality reduction degree due to graininess is determined on the basis of information on the exposed state of the image recorded onto the photographic film and the print size which is printed based on the digital image data in addition to the selected sensitivity of the photographic film, and at least one of the graininess parameter and the sharpness parameter is determined on the basis of the result of determination of image quality reduction degree.

12. An image processing method according to claim 11, wherein in a case in which the standard sensitivity of the photographic film is high, in a case in which the image recorded onto the photographic film is underexposed, and in a case in which the print size is large, the graininess parameter is set small, and in a case in which the film size is small, the sharpness parameter is determined so that the sharpness emphasizing degree is strong.

13. An image processing method according to claim 8, wherein in said determining step, at least one of the graininess parameter and the sharpness parameter is determined on the basis of the image quality reduction degree due to graininess, which is determined based on the standard sensitivity of a photographic film, and an input data representing the sharpness emphasizing degree.

14. An image processing method according to claim 8, wherein in said image processing step, a low frequency component of the digital image data, an intermediate frequency component of luminance component which is obtained from an intermediate/high frequency component of the digital image data, and a high frequency component of luminance component which is obtained from the intermediate/high frequency component of the digital image data are determined, and a sum of a product of the intermediate frequency component of the luminance component and the graininess parameter, a product of the high frequency component of the luminance component and the sharpness parameter, and the low frequency component of the digital image data is output as an image processed signal.

15. An image processing apparatus, comprising:

generating means which picks up an image recorded onto a developed photographic film and generates a digital image data;

storing means which stores corresponding relationship between a plurality of film sizes of a photographic film and the standard sensitivity of a photographic film which correlates to each of the film sizes;

selecting means which selects the standard sensitivity of the photographic film corresponding to the film size of the developed photographic film on the basis of the corresponding relationship stored in said storing means;

determining means which determines at least one of a graininess parameter for reducing graininess and a sharpness parameter for determining sharpness emphasizing degree on the basis of the selected standard sensitivity of the photographic film; and processing means which effects image processing of the digital image data by using at least one of the determined graininess parameter and sharpness parameter.

16. An image processing apparatus according to claim 15, wherein said determining means determines image quality reduction degree due to graininess on the basis of the selected standard sensitivity of the photographic film and determines at least one of the graininess parameter and the sharpness parameter on the basis of the result of determination of image quality reduction degree.

17. An image processing apparatus according to claim 15, wherein said determining means determines the image quality reduction degree due to graininess on the basis of information on the exposed state of the image recorded onto the photographic film and the print size which is printed based on the digital image data in addition to the selected sensitivity of the photographic film, and said determining means determines at least one of the graininess parameter and the sharpness parameter on the basis of the result of determination of image quality reduction degree.

18. An image processing apparatus according to claim 15, wherein said image processing apparatus further includes discriminating means which discriminates the film size of the developed photographic film, and said selecting means selects the standard sensitivity of the photographic film corresponding to the film size of the developed photographic film on the basis of the corresponding relationship and the result of discrimination of film size by said discriminating means.

19. An image processing apparatus according to claim 15, wherein said image processing apparatus further includes discriminating means which discriminates the film size of the developed photographic film on the basis of the result of selection of a menu displayed on display means, and said selecting means selects the standard sensitivity of the photographic film corresponding to the film size of the developed photographic film on the basis of the corresponding relationship and the result of discrimination by said discriminating means.

20. An image processing apparatus according to claim 15, wherein said image processing apparatus further includes input means which inputs the film size of the developed photographic film, and said selecting means selects the standard sensitivity of the photographic film corresponding to the film size of the developed photographic film on the basis of the input film size information and the corresponding relationship stored in said storing means.

21. An image processing apparatus, comprising:

an image generator which picks up an image recorded onto a developed photographic film and generates a digital image data;

a storage device which stores a corresponding relationship between a plurality of film sizes of a photographic film and a standard sensitivity of a photographic film which correlates to each of the plurality of film sizes;

a selector which selects the standard sensitivity of the photographic film corresponding to the film size of the developed photographic film on the basis of the corresponding relationship stored in said storing device;

determining device which determines at least one of a graininess parameter for reducing graininess and a sharpness parameter for determining sharpness emphasizing degree on the basis of the selected standard sensitivity of the photographic film; and processing device which effects image processing of the digital image data by using at least one of the determined graininess parameter and sharpness parameter.

* * * * *